(12) United States Patent
Eberhardt et al.

(10) Patent No.: US 12,338,363 B2
(45) Date of Patent: Jun. 24, 2025

(54) SURFACE PROPERTIES OF RADIATION-CURED COATINGS

(71) Applicant: BYK-Chemie GmbH, Wesel (DE)

(72) Inventors: Marc Eberhardt, Wesel (DE); Guillaume Jaunky, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 206 days.

(21) Appl. No.: 18/023,769

(22) PCT Filed: Aug. 30, 2021

(86) PCT No.: PCT/EP2021/073880
§ 371 (c)(1),
(2) Date: Feb. 28, 2023

(87) PCT Pub. No.: WO2022/049031
PCT Pub. Date: Mar. 10, 2022

(65) Prior Publication Data
US 2023/0340295 A1  Oct. 26, 2023

(30) Foreign Application Priority Data
Sep. 2, 2020 (EP) .................................... 20194189

(51) Int. Cl.
*C09D 183/06* (2006.01)

(52) U.S. Cl.
CPC .................................. *C09D 183/06* (2013.01)

(58) Field of Classification Search
CPC .................................................... C09D 183/06
See application file for complete search history.

(56) References Cited

U.S. PATENT DOCUMENTS

| | | | |
|---|---|---|---|
| 4,963,438 A | 10/1990 | Weitemeyer | |
| 4,978,726 A | 12/1990 | Doehler | |
| 5,034,491 A | 7/1991 | Wewers | |
| 5,552,506 A | 9/1996 | Ebbrecht | |
| 6,211,322 B1 | 4/2001 | Doehler | |
| 9,243,153 B2 | 1/2016 | Hans | |
| 2005/0287300 A1* | 12/2005 | Herrwerth | C08G 77/38 427/255.5 |
| 2009/0234089 A1 | 9/2009 | Ueyama | |

FOREIGN PATENT DOCUMENTS

| | | |
|---|---|---|
| EP | 2889321 | 7/2015 |
| EP | 3604393 | 2/2020 |
| JP | 05132557 | 5/1993 |
| JP | 201914892 | 1/2019 |
| WO | 2013135686 | 9/2013 |
| WO | 2018181650 | 10/2018 |
| WO | 2019020542 | 1/2019 |

OTHER PUBLICATIONS

C. Howard et al., "Functional Additives for Energy-Curable Coatings," 10 pages.
H.K. Kim et al., "Characterization of UV-cured polyester acrylate films containing acrylate functional polydimethylsiloxane," European Polymer Journal, vol. 39, No. 11, Nov. 1, 2003, pp. 2235-2241.
H.K. Kim et al., "Determination of key variables affecting surface properties of UV curable coatings using experimental design," Polymer Testing, vol. 21, No. 4, Jan. 1, 2002, pp. 417-424.
International Search Report and Written Opinion for Application No. PCT/EP2021/073880 dated Jan. 4, 2022.
TEGO Rad, Data Sheet, Evonik, Jul. 15, 2020.

* cited by examiner

*Primary Examiner* — Dah-Wei D. Yuan
*Assistant Examiner* — Andrew J Bowman

(57) ABSTRACT

The invention relates to a method of improving the surface properties of a radiation cured coating, comprising adding to a radiation-curable coating composition 0.1 to 10.0% by weight, based on the total weight of the radiation-curable coating composition, of a polymer (A) having a polysiloxane backbone and at least two methacryloyl groups connected to the polysiloxane backbone via linking groups, wherein the linking groups comprise at least one non-cyclic ether group, and wherein the polysiloxane backbone is connected to the linking groups via a Si—C bond, and wherein polymer (A) is prepared by a process comprising i) Providing a polysiloxane backbone having at least two Si—H groups, ii) Providing a molecule having at least one methacryloyl group, one allyl group, and at least one non-cyclic ether group located between the allyl group and the at least one methacryloyl group, and iii) Forming a covalent bond between the polysiloxane backbone i) and the molecule ii) by reacting the Si—H groups with the allyl group via a hydrosilylation reaction.

15 Claims, No Drawings

SURFACE PROPERTIES OF RADIATION-CURED COATINGS

The invention relates to a method of improving the surface properties of a radiation cured coating.

In radiation curing, reactive monomers and oligomers are converted to high molecular weight materials by high energy radiation, such as ultraviolet light or electron beams. Radiation curing is a very fast process compared to heat treatment, which allows high production speeds. In addition, the fast curing allows a space-saving and material-saving operation. Radiation curing offers clear benefits in terms of the environment, such as low emissions and lower energy requirements. Radiation curing is used for example for the production of coating materials, paints, printing inks, etc. The coatings are characterized in many cases by a better quality, especially in terms of gloss and abrasion resistance.

Due to the rapid spread of this technology, the requirements for radiation curable compositions are steadily increasing and becoming increasingly diverse. The use of silicone additives in curable compositions is a method to obtain cured products having improved properties such as dirt-repellent coatings with so-called easy-to-clean properties, water and oil repellency and tape release properties among others to various industrial materials. Because of the advantages enumerated above, radiation curable coating compositions are becoming increasingly important.

Most radiation-curable compositions are polymerized in a free-radical reaction, using (meth)acrylate groups. Therefore, modifying additives with (meth)acrylate functionality is an appropriate approach.

Preferably, acrylate groups are used in radiation curable systems. The acrylate groups can be bonded to the backbone of the polysiloxane by way of Si—O—C or Si—C bonds.

DE 3841843 describes acrylated polysiloxanes, which can be produced by various condensation reactions resulting in Si—O—C bonds that especially in waterborne systems are labile and thus give unstable products. Moreover, the reaction of chloro-polysiloxanes with hydroxy-functional acrylates like hydroxyethyl acrylate as an example, releases hydrochloric acid, which must be neutralized with ammonia and finally removed by a time-consuming filtration process.

DE 3820294 describes acrylated polysiloxanes, which can be produced by multistep reactions involving hydrosilylation and followed by a polymer analogous reaction. Hydrosilylation can be achieved by the addition of unsaturated compounds such as the addition of allyl glycidyl ether following reaction of the obtained epoxy functional polysiloxane with acrylic acid to produce acrylated molecules. This two-step method does not allow to introduce organic modification such as polyether, important for the compatibility in the radiation curable composition, together with the acryl functionality.

DE 3819140 and U.S. Pat. No. 6,211,322 describe two-step processes, wherein in a first step a hydroxyl-functional allyl compound is reacted with an Si—H functional polysiloxane to give a hydroxyl functional polyether-modified polysiloxane. In a second step the hydroxyl groups are acrylated. Usually highly colored products are obtained due to the use of metal catalyst, polymerization inhibitor and removal of the excess of reactant, typically acrylic acid or butyl acrylate, by distillation at high temperature in order to achieve a high acrylation degree.

US 2009/0234089 describes monomers for ophthalmic lenses, which can be more safely worn. More in particular, the document relates to a hydrophilic polysiloxane macromonomer containing a polyoxyethylene as hydrophilic side chains.

Kim H. K. Et al: "Determination of key variables affecting surface properties of UV curable coatings using experimental design", Polymer Testing, Vol. 21, No. 4, January 2002, pp. 417-424, describes UV-curable coatings comprising a silicone acrylate. Mar resistance, slip, and leveling are attributed to the silicone acrylate.

Kim H. K. Et al: "Characterization of UV-cured polyester acrylate films containing acrylate functional polydimethylsiloxane", European Polymer Journal, Vol. 39, No. 11, November 2003, pp. 2235-2241, describes testing of an acrylate functional polydimethylsiloxane as a reactive additive in UV-curable coating formulations. Low coefficient of friction is associated with the silicone acrylate.

There is an ongoing need for methods of improving the surface properties of radiation cured coatings. The method should use radiation-curable polysiloxanes with well-defined structures and control over the number of radiation curable functionalities. The obtained products should not necessitate any further purification/filtration step or dilution step in reactive diluents. They should be low colored especially when use in clear coats and available and be ready to use as 100% active substance in radiation curable compositions to give more flexibility to the formulator.

The method should not result in haze and/or surface defects but having excellent surface properties in radiation curable coatings. Furthermore, improved surface slip properties, long-lasting tape release properties and scratch resistance, as well as water and oil repellency and increased resistance to soiling of all types of the cured product are desired. Moreover, there is a need to produce the additives as 100% active substance by an easy process that provide low colored multifunctional additive with a plurality of radiation curable groups. The object of the invention is to provide a method which provides radiation cured coatings having improved surface properties and tape release properties. This is to be understood as an outstanding balance between leveling and reduced turbidity and other advantageous properties such as excellent sliding and long-lasting tape release properties. A further object of the present invention was to retain advantageous properties such as good wetting, low cratering, outstanding leveling, and low haze.

The invention provides a method of improving the surface properties of a radiation cured coating, comprising adding to a radiation-curable coating composition 0.1 to 10.0% by weight, based on the total weight of the radiation-curable coating composition, of a polymer (A) having a polysiloxane backbone and at least two methacryloyl groups connected to the polysiloxane backbone via linking groups, wherein the linking groups comprise at least one non-cyclic ether group, and wherein the polysiloxane backbone is connected to the linking groups via a Si—C bond, and wherein polymer (A) is prepared by a process comprising
  i) Providing a polysiloxane backbone having at least two Si—H groups,
  ii) Providing a molecule having at least one methacryloyl group, one allyl group, and at least one non-cyclic ether group located between the allyl group and the at least one methacryloyl group, and
  iii) Forming a covalent bond between the polysiloxane backbone i) and the molecule ii) by reacting the Si—H groups with the allyl group via a hydrosilylation reaction.

The method of the invention meets the above-mentioned objectives.

In a typical embodiment of the method, the improved surface properties comprise at least one of surface slip, water repellency, dirt removal properties, resistance to dirt adhesion, and tape release properties.

Generally, the radiation-curable coating composition is applied to a substrate and cured by exposure to actinic radiation. Therefore, the method of the invention typically further comprises applying the radiation-curable coating composition to a substrate and curing the composition by exposure to actinic radiation. Examples of actinic radiation are ultraviolet radiation and electron beam radiation.

According to the method of the invention, polymer (A) is added to the radiation-curable coating composition in an amount of 0.1 to 10.0% by weight, calculated on the weight of the coating composition. In preferred embodiments, polymer (A) is added to the radiation-curable coating composition in an amount of 0.2 to 5.0% by weight, or from 0.2 to 3.0% by weight.

In typical embodiments, the radiation-curable coating composition further comprises a radiation curable binder which is different from the polymer (A).

As the radiation-curable binder, (meth) acryl-functional (meth) acrylate copolymers, polyether acrylates, polyester acrylates, epoxy acrylates, urethane acrylates, amino acrylates, melamine acrylates and the corresponding methacrylates are generally used. Preference is given to using urethane (meth) acrylates and polyester (meth) acrylate resins.

The radiation-curable binder is preferably used in amounts of from 30 to 99% by weight, particularly preferably from 30 to 90% by weight and very particularly preferably from 45 to 80% by weight, calculated on the weight of the coating composition.

It is preferred that the linking groups in polymer (A), independent of each other, comprise 1 to 100 non-cyclic ether groups.

The non-cyclic ether groups generally comprise polymerized units of alkylene oxides. The alkylene oxides are preferably comprise at least one of ethylene oxide and propylene oxide. In some embodiments, the non-cyclic ether groups comprise polymerized units of glycidol or trimethylolpropane Oxetane (TMPO). The polymerized units of alkylene oxides can be combined with glycidol or TMPO as well. If the non-cyclic ether groups comprise polymerized units of more than one type of monomer units, such units can be arranged statistically, as a gradient, or in blocks.

The number of polymerized monomer units is generally in the range of 1 to 100, such as 3 to 50, or 3 to 20.

It is particularly preferred, that the non-cyclic ether groups are polyalkylene oxide groups, such as polyethylene oxide groups, polypropylene oxides groups, and copolymers of ethylene oxide and propylene oxide.

Generally, the polysiloxane backbone of polymer (A) comprises repeating units of the formula (I) —[O-SiR$_2$]—, wherein R independent of each other represents a hydrocarbyl group having 1 to 30 carbon atoms. In preferred embodiments, the polysiloxane backbone comprises 2 to 300 repeating units of formula (I).

In a further preferred embodiment, the polysiloxane backbone provided in step i) is a polydimethylsiloxane having two terminal Si—H groups.

In another embodiment, the polysiloxane backbone provided in step i) is a polydimethylsiloxane having at least two lateral Si—H groups.

Suitable polysiloxanes having at least two Si—H groups can be represented by the following general formula (I)

wherein
M represents [R$_3$SiO$_{1/2}$]
M' represents [R$_2$SiHO$_{1/2}$]
D represents [R$_2$SiO$_{2/2}$]
D' represents [RSiHO$_{2/2}$]
T represents [RSiO$_{3/2}$]
Q represents [SiO$_{4/2}$]
a is an integer of 0 to 10, preferably 0 to 2, more preferably 2,
b is an integer of 0 to 10, preferably 0 to 2, more preferably 2,
c is an integer of 0 to 300, preferably 2 to 250, more particularly 5 to 200,
d is an integer of 0 to 100, preferably 0 to 50, more particularly 0 to 20,
e is an integer of 0 to 10, preferably 0 to 5, more particularly 0,
f is an integer of 0 to 10, preferably 0 to 5, more particularly 0, with the proviso that a+b≥2 and b+d≥2
R independent of each other represents a C$_1$ to C$_{30}$ hydrocarbon radical, preferably methyl, octyl or phenyl, (α-methyl)styryl), more preferably methyl.

The description of polysiloxanes using M, D, T and Q units is generally known in the art. Compounds of formula (I) can be prepared by well-known equilibration methods.

The method of the invention also includes providing a molecule having at least one methacryloyl group, one allyl group, and at least one non-cyclic ether group located between the allyl group and the at least one methacryloyl group. This molecule generally has a number average molecular weight in the range of 170 to 6000 g/mol.

In a preferred embodiment of the method, the molecule having at least one methacryloyl group, one allyl group, and at least one non-cyclic ether group located between the allyl group and the at least one methacryloyl group provided in step ii) is an allyloxy polyethyleneglycol methacrylate.

The molecule having at least one methacryloyl group, one allyl group, and at least one non-cyclic ether group located between the allyl group and the at least one methacryloyl group provided in step ii) can be prepared by known processes. One such process comprises
i) providing
a) an allyl polyether with one or more hydroxyl groups
b) a molecule having one methacrylic group, and
ii) forming one or more covalent bonds between the allylpolyether a) and the molecule b) by a (trans) esterification reaction.

Polymer (A) is prepared by forming a covalent bond between the polysiloxane backbone i) and the molecule having at least one methacryloyl group, one allyl group, and at least one non-cyclic ether group located between the allyl group and the at least one methacryloyl group by reacting the Si—H groups with the allyl group via a hydrosilylation reaction. Such hydrosilylation reactions are described in WO 2019/020542.

Polymer (A) generally has a weight average molecular weight (Mw) in the range of from 2000 to 100000 g/mol, preferably of from 5000 to 60000 g/mol, more preferably of from 4000 to 50000 g/mol, still more preferably of from 3000 to 40000 g/mol.

The weight average molecular weight can be determined by gel permeation chromatography carried out at 22° C. using a separation module Waters 2695 and a refractive index detector Waters 2414. Toluene or THF is a suitable eluent, using polydimethylsiloxane standards for calibration.

Optionally, polymer (A) can have additional structural segments that do not bear a methacrylic group. Such optional segments may be included to adjust and fine-tune the compatibility with the systems wherein they are employed, and other properties of polymer (A). Examples of such optional segments are polyether segments, for example based on polyethylene oxide and/or polypropylene oxide, polyester segments, hydrocarbon segments, fluorinated hydrocarbon segments, and polyurethane segments. These optional segments may be connected to the polysiloxane backbone by hydrosilylation or dehydrogenative condensation. In one embodiment, the additional structural segments have the same type of segments. In other embodiments, additional structural segments with different types of segments may be present.

In some embodiments, the method of the invention further comprises adding to the radiation-curable coating composition a polymer having a polysiloxane backbone and one methacryloyl group connected to the polysiloxane backbone via linking groups, wherein the linking groups comprise at least one non-cyclic ether group, and wherein the polysiloxane backbone is connected to the linking groups via a Si—C bond, and wherein the polysiloxane backbone further has a pendent or terminal polyalkylene oxide segment comprising at least 25 mol-% polypropylene oxide.

In still further embodiments, the method comprises adding to the radiation-curable composition a polymer having a polysiloxane backbone and at least two polyalkylene oxide segments comprising at least 25 mol-% polypropylene oxide connected to the polysiloxane backbone via Si—C bonds.

The radiation-curable coating composition may also contain at least one reactive diluent.

In accordance with DIN 55945, reactive diluents or reactive solvents are all those solvents which, upon curing by chemical reaction, largely become part of the coating. Examples of radiation-curable reactive diluents include butyl acrylate, (2-ethylhexyl) acrylate, lauryl acrylate, n-hexyl acrylate, (2-phenoxyethyl) acrylate, isobornyl acrylate, dipropylene glycol diacrylate, tripropylene glycol diacrylate, 1,6-hexanediol diacrylate, pentaerythritol tri or tetraacrylate, trimethylolpropane triacrylate, ethyl triglycol methacrylate, furfuryl methacrylate, (2-hydroxyethyl) methacrylate, (2-hydroxypropyl) methacrylate, lauryl methacrylate, tetrahydrofurfuryl methacrylate, allyl methacrylate, 1,3-butanediol dimethacrylate, 1,4-butanediol dimethacrylate, diethylene glycol dimethacrylate, glycidyl methacrylate, 1,6-hexanediol dimethacrylate, triethylene glycol dimethacrylate, trimethylolpropane trimethacrylate, ethyl diglycol acrylate, (4-tert-butylcyclohexyl) acrylate, N-vinylcaprolactam, N-vinylpyrrolidone, vinyl propionate, bisphenol A dimethacrylate, Dianoldiacrylate, 1,2-dodecanediol dimethacrylate, N, N-divinyl-ethyleneurea, ethylene glycol dimethacrylate, octadecyl diacrylate, polyethylene glycol n-dimethacrylate, dihydrodicyclopentadienyl acrylate, ethyl vinyl ether, n-propyl vinyl ether, isopropyl vinyl ether, n-butyl vinyl ether, isobutyl vinyl ether, octadecyl vinyl ether, cyclohexyl vinyl ether, 1,4-butanediol divinyl ether, 1,4-butanediol monovinyl ether, 1,4-cyclohexanedimethanol divinyl ether, 1,4-cyclohexanedimethanolnonovinyl ether, diethylene glycol divinyl ether, and triethylene glycol divinyl ether.

It is also possible to use reactive diluents which, in addition to a reactive double bond, carry one or more other reactive groups. Examples of such reactive diluents include allyl glycidyl ether, (2-hydroxyethyl) acrylate, (2-hydroxypropyl) acrylate, (2-hydroxyethyl) acrylate phosphate, (2-hydroxyethyl) methacrylate phosphate, and [2-(tertiary-butylamino) ethyl] methacrylate.

Radiation-curable reactive diluents are generally used in an amount of from 0 to 65% by weight, preferably from 20 to 62% by weight, particularly preferably from 35 to 60% by weight and very particularly preferably from 40 to 55% by weight, calculated on the weight of the coating composition.

The radiation curable coating composition optionally contains an organic or inorganic non-radiation curing solvent. As the inorganic solvent, for example, water can be used. Preference is given to using organic solvents. Suitable organic solvents are the typical organic solvents known to the person skilled in the art, for example aliphatic, cycloaliphatic, aromatic solvents, typical alcohols, ethers, esters and/or ketones such as, for example, ethanol, isopropanol, butanol, butylglycol, butyldiglycol, butylacetate, methyl isobutylketone, methyl ethyl ketone, Xylene, toluene, Shellsol A, Solvesso products.

The radiation-curable coating composition may further contain one or more photoinitiators.

As photoinitiators additives in radiation-curable systems are called, which form reactive intermediates due to absorption of ultraviolet or visible radiation, which can trigger a polymerization reaction.

Examples of suitable photoinitiators include 2,2-dimethoxy-1,2-diphenyl-ethanone, (1-Hydroxycyclohexyl) phenylmethanone, 2-hydroxy-2-methyl-1-phenyl-1-propanone, 2-hydroxy-1-[4-(2-hydroxyethoxy)-phenyl]-2-methyl-1-propanone, 2-benzyl 2-dimethylamino-1-(4-morpholinophenyl)-1-butanone, 2-methyl-1-[4-(methylthio) phenyl]-2-morpholino-1-propanone, α, α-diethoxyacetophenone, diphenyl-(2,4,6-trimethylbenzoyl) phosphine oxide, bis (2,6-dimethoxybenzoyl)-(2,4,4-trimethylpentyl) phosphine oxide, 1-phenyl-1,2-propanedione-2-[0-(ethoxycarbonyl)-oxime], Bis ($n^5$-cyclopentadienyl) bis [2,6-difluoro-3-(1H-1-pyrrol-1-yl)-phenyl] titanium, 2-isopropylthioxanthone, 1,2-diphenyl-2-(p-tolylsulfonyloxy) ethanone.

If one or more photoinitiators are included, they are generally used in a total amount of from 0.5 to 5.0% by weight, preferably from 1.0 to 4.5% by weight and very particularly preferably from 2.0 to 4% by weight, calculated on the weight of the coating composition.

The radiation-curable coating composition may further comprise at least one UV absorber. The term UV absorber is understood to mean a class of light stabilizers which are added to paints or plastics for protection against the harmful influence of UV light in the range from 290 to 400 nm. The most important UV absorber classes are 2-(2-hydroxyphenyl) 2H-benzotriazoles, (2-hydroxyphenyl)-s-triazines, hydrobenzophenones and oxalanilides.

In addition, the radiation-curable coating composition may contain pigments or fillers. The choice of such pigments or fillers can be selected by the skilled person according to the requirements of the individual case.

The radiation-curable coating composition may further contain deaerating agents, defoamers, emulsifiers, wetting and dispersing agents, adhesion promoters, film-forming adjuvants, rheology control additives (thickeners), flame retardants, siccatives, drying agents, anti-skinning agents, corrosion inhibitors, waxes, matting agents and other additives known to those skilled in the art. Such additives can be selected by the skilled person according to the requirements of the individual case on the basis of his specialist knowledge and used in the customary and known, effective amounts.

The method of the invention provides coatings having excellent tape release, anti-adhesive and dirt-repellent properties. Such coatings are suitable as anti-graffiti coatings, tape release coatings, self-cleaning surfaces, ice-repellent coatings, for example for anti-soiling wood and furniture coatings and various release coatings for pressure sensitive adhesives. Other applications include UV & EB flexographic inks, printing inks (including overprint varnishes), inkjet inks, industrial coatings, can coatings, and powder coatings among others. In addition, due to the extremely broad compatibility of the polymer (A). the coatings are also suitable as transparent coating compositions.

The method of the invention does not adversely affect other properties, such as, for example, weather resistance or mechanical resistance, of the coatings. The physical properties of the coatings, for example with regard to corrosion protection, gloss retention and weathering resistance, are not impaired by the method of the invention. Coatings prepared according to the method of the invention generally also show the desired properties over a period of several years and retain these properties over several cleaning cycles.

Examples

Raw materials and pore sizes HR4, HR2 and HR1 was used as separating columns. The eluent used was Toluene with an elution rate of 1 ml/min. The conventional calibration was carried out using polydimethysiloxane standards.

COMPARATIVE EXAMPLE TEGO® Rad 2500

Radically cross-linkable acrylated polysiloxane that imparts slip and defoaming properties to UV inks and coatings and recommended as first choice when formulating 'release' coatings.

Comparative Example 1

In a first step, a polydimethylsiloxane with terminal SiH groups (124.9 g, 0.098 equivalents of SiH), having an average chain length of N=39 and the general formula $MHD_{39}MH$, 98 mg of a diluted KARSTEDT Concentrate 20% sol. (1 g of KARSTEDT Concentrate 20% sol. was diluted with 99 g of Xylene) and 19.8 mg of 4-Methoxyphenol were added to a 500 mL 4-neck flask, equipped with stirrer, dropping funnel, thermometer, $N_2$-inlet and reflux condenser and heated with stirring to 80° C. At this temperature, 54.33 g (0.118 equivalents of allyl-groups) of Uniox PKA-5003 were added dropwise over a period of 30

| Name | Supplier | Description |
|---|---|---|
| EBBECRYL ® 608 | allnex | bisphenol A epoxy diacrylate, diluted 25% by weight with the reactive diluent OTA-480, propoxylated glycerol triacrylate |
| TMPTA | Arkema | Trimethylolpropane triacrylate |
| TPGDA | Arkema | Tripropyleneglycol diacrylate |
| Benzophenone | Molekula Group | |
| EBBECRYL ® P115 | allnex | copolymerizable amine used as a hydrogen donor, or photoactivator, in ultraviolet light (UV) curable coatings and inks |
| Laromer ® LR 8986 | BASF | medium-viscosity, highly reactive epoxy acrylate |
| Ebecryl ® 210 | allnex | aromatic urethane diacrylate oligomer |
| HDDA | Arkema | 1,6-hexanediol diacrylate |
| Darocure ® 4265 | BASF | highly efficient liquid curing agent, alpha-hydroxyketone |
| KARSTEDT Concentrate 20% sol. | HERAEUS | Platinum(0), 1,3-divinyl-1,1,3,3-tetramethyldisiloxane complexes containing 20% Pt. |
| 4-methoxyphenol | Sigma-Aldrich | |
| 2,6-di-tert.-butyl-4-methylphenol | Sigma-Aldrich | |
| Bisomer AA E 450 MA | GEO ® Specialty Chemicals | Poly(ethyleneglycol), α-(allyl)-ω-(methacryloxy)- |
| Uniox PKA-5003 | NOF Corporation | Polyethyleneglycolallylether, average molecular weight 450 g/mol, 100% EO |
| Zirconium(IV) acetylacetonate | Alfa Aesar | |
| Methylmethacrylate | Alfa Aesar | |
| Xylene | Alfa Aesar | |
| TEGO Rad ® 2500 | Evonik | acrylated polysiloxane |

Analytical Methods
Iodine Number

The iodine number was determined according to DIN 53241-1 via volumetric measurement of $H_2$.

GPC-Analysis

The number-average and weight-average molecular weights and the molecular weight distribution were determined according to DIN 55672-1:2007-08 at 40° C. using a high-pressure liquid chromatography pump (WATERS 600 HPLC pump) and a refractive index detector (Waters 410). A combination of 3 Styragel columns from WATERS with a size of 300 mm×7.8 mm ID/column, a particle size of 5 μm minutes. At the end of the addition, stirring was continued at 80° C. until, after 1 hour, a conversion of more than 99% was attained. The conversion was checked by determining the SiH value (iodine number) every 20 minutes. After that, 19.8 mg 2,6-Di-tert.-butyl-4-methylphenol was added and the volatiles were removed by distillation under vacuum. The obtained hydroxyl-terminal polyether polydimethylsiloxane was a clear, slightly yellow-brownish liquid.

In a second step, the obtained product of the first step was methacrylated using methyl methacrylate and Zirconium (IV) acetylacetonate as a catalyst. A 500 mL 4-neck flask, equipped with stirrer, thermometer, $N_2$-inlet and water separator with reflux condenser was charged with 126.7 g product of the first step (0.114 equivalents), 13.68 g methyl methacrylate (0.137 equivalents) and 0.21 g 4-methoxyphenol. Under stirring 0.416 g Zirconium(IV) acetylacetonate were added and the resulting reaction mixture was heated to 90° C. for 15 minutes. The temperature was then raised to 100° C. and the whole mixture was stirred for 6 hours at 100° C. After that the volatiles were removed by distillation under vacuum (10 mbar, 75° C. heating bath).

NMR analysis of the final product showed a methacrylation degree of 45%. GPC analysis gave the following results: Mn=2197 g/mol, Mw=5053 g/mol, Mw/Mn=2.3

Comparative Example 2

In a first step, the synthesis of 2-allyloxyethyl acrylate was conducted as follows:

A mixture of 2-allyloxy ethanol (30 g, 0.29 mol, Sigma-Aldrich), methylene chloride (266 g, Sigma-Aldrich) and triethylamine (33.39 g, 0.33 mol, Sigma-Aldrich) was placed in a 4-neck flask, equipped with stirrer, dropping funnel, thermometer, $N_2$-inlet and reflux condenser. The mixture was cooled with an ice bath. Acryloyl chloride (29.87 g, 0.33 mol, Alfa Aesar) was added dropwise over 1 hour. After that, the ice bath was removed and the mixture stirred for 2 hours at room temperature, then filtered. The filtrate was extracted several times with deionized water. The resulting organic phase was dried with magnesium sulfate followed by vacuum distillation to remove all volatiles. NMR analysis showed that 2-allyloxyethyl acrylate was obtained as a nearly colorless liquid (43.7 g, 0.28 mol) in quantitative yield.

In a second step, a polydimethylsiloxane with terminal SiH groups (111 g, 0.087 equivalents of SiH), having an average chain length of N=39 and the general formula $MHD_{39}MH$, 87 mg of a diluted KARSTEDT Concentrate 20% sol. (1 g of KARSTEDT Concentrate 20% sol. was diluted with 99 g of Xylene) and 17.6 mg of 4-Methoxyphenol were added to a 500 mL 4-neck flask, equipped with stirrer, dropping funnel, thermometer, $N_2$-inlet and reflux condenser and heated with stirring to 80° C. At this temperature, 16.3 g (0.105 equivalents of allyl-groups) of 2-allyloxyethyl acrylate (from the first step) were added dropwise over a period of 30 minutes. At the end of the addition, stirring was continued at 80° C. while simultaneously measuring the SiH value (iodine number) every 20 minutes. After 40 minutes, the SiH-value was zero indicating a complete consumption of SiH-groups. The reaction mixture has turned into a brownish, heterogeneous, muddy-turbid composition. Without stirring, it separated into a liquid phase and a swollen precipitate, indicating that the reaction did not proceed as desired.

Comparative Example 3

In a first step, the acrylation of Uniox PKA 5003 was conducted as follows:

A mixture of Uniox PKA 5003 (59.7 g, 0.13 equivalents of OH-groups), methylene chloride (266 g, Sigma-Aldrich) and triethylamine (14.9 g, 0.15 mol, Sigma-Aldrich) was placed in a 4 neck flask, equipped with stirrer, dropping funnel, thermometer, $N_2$-inlet and reflux condenser. The mixture was cooled with an ice bath. Acryloyl chloride (13.35 g, 0.15 mol, Alfa Aesar) was added dropwise over 1 hour. After that, the ice bath was removed and the mixture stirred for 2 hours at room temperature, then filtered. The filtrate was extracted several times with deionized water. The resulting organic phase was dried with magnesium sulfate followed by vacuum distillation to remove all volatiles. NMR analysis showed that Uniox PKA 5003 acrylate was obtained as a nearly colorless liquid (63.1 g, 0.12 mol) in quantitative yield.

In a second step, a polydimethylsiloxane with terminal SiH groups (50 g, 0.039 equivalents of SiH), having an average chain length of N=39 and the general formula MHD39MH, 39.2 mg of a diluted KARSTEDT Concentrate 20% sol. (1 g of KARSTEDT Concentrate 20% sol. was diluted with 99 g of Xylene) and 7.9 mg of 4-Methoxyphenol were added to a 500 mL 4-neck flask, equipped with stirrer, dropping funnel, thermometer, N2-inlet and reflux condenser and heated with stirring to 80° C. At this temperature, 24.16 g (0.047 equivalents of allyl-groups) of Uniox PKA 5003 acrylate (from the first step) were added dropwise over a period of 30 minutes. At the end of the addition, stirring was continued at 80° C. while simultaneously measuring the SiH value (iodine number) every 20 minutes. After 40 minutes, the SiH-value was zero indicating a complete consumption of SiH-groups. The reaction mixture has turned into a heterogeneous, muddy-turbid composition. Without stirring, it separated into a liquid phase and a swollen precipitate, indicating that the reaction did not proceed as desired.

Example 1

A polydimethylsiloxane with terminal SiH groups (124.9 g, 0.098 equivalents of SiH), having an average chain length of N=39 and the general formula $MHD_{39}MH$, 98 mg of a diluted KARSTEDT Concentrate 20% sol. (1 g of KARSTEDT Concentrate 20% sol. was diluted with 99 g of Xylene) and 19.8 mg of 4-Methoxyphenol were added to a 500 mL 4-neck flask, equipped with stirrer, dropping funnel, thermometer, $N_2$-inlet and reflux condenser and heated with stirring to 80° C. At this temperature, 73.11 g (0.118 equivalents of allyl-groups) of Bisomer AA E 450 MA were added dropwise over a period of 30 minutes. At the end of the addition, stirring was continued at 80° C. until, after 1 hour, a conversion of more than 99% was attained. The conversion was checked by determining the SiH value (iodine number) every 20 minutes. After that, 19.8 mg 2,6-Di-tert.-butyl-4-methylphenol was added and the volatiles were removed by distillation under vacuum. The obtained reaction product was a clear, slightly yellow-brownish liquid.

NMR-analysis confirmed the expected structure.

GPC analysis gave the following results: Mn=1692 g/mol, Mw=8494 g/mol, Mw/Mn=5.02

Example 2

A polydimethylsiloxane with lateral SiH groups (78.07 g, 0.083 equivalents of SiH), having an average chain length of N=93 and the general formula $MD^H_7D_{86}M$, 83 mg of a diluted KARSTEDT Concentrate 20% sol. (1 g of KARSTEDT Concentrate 20% sol. was diluted with 99 g of Xylene), 13 mg of 4-Methoxyphenol and 57 g Xylenes were added to a 500 mL 4-neck flask, equipped with stirrer, dropping funnel, thermometer, $N_2$-inlet and reflux condenser and heated with stirring to 80° C. At this temperature, 61.71 g (0.1 equivalents of allyl-groups) of Bisomer AA E 450 MA were added dropwise over a period of 30 minutes. At the end of the addition, stirring was continued at 80° C. until, after 2 hours, a conversion of more than 99% was attained. The conversion was checked by determining the SiH value (iodine number) every 20 minutes. After that, 13 mg 2,6-Di-tert.-butyl-4-methylphenol was added and the volatiles were removed by distillation under vacuum. The obtained reaction product was a clear, slightly yellow-brownish liquid.

NMR-analysis confirmed the expected structure.

GPC analysis gave the following results: Mn=4080 g/mol, Mw=36050, Mw/Mn=8.8

Example 3

A polydimethylsiloxane with terminal SiH groups (71.64 g, 0.056 equivalents of SiH), having an average chain length of N=39 and the general formula $MHD_{39}MH$, 56 mg of a diluted KARSTEDT Concentrate 20% sol. (1 g of KARSTEDT Concentrate 20% sol. was diluted with 99 g of Xylene) and 9 mg of 4-Methoxyphenol were added to a 500 mL 4-neck flask, equipped with stirrer, dropping funnel, thermometer, $N_2$-inlet and reflux condenser and heated with stirring to 80° C. At this temperature, a mixture of a polypropyleneglycol-mono-allyether (containing an average of 3 propylenglycol units) (6.55 g, 0.028 equivalents of allyl groups) and Bisomer AA E 450 MA (24.29 g, 0.039 equivalents of allyl groups) were added dropwise over a period of 30 minutes. At the end of the addition, stirring was continued at 80° C. until, after 2 hours, a conversion of more than 99% was attained. The conversion was checked by determining the SiH value (iodine number) every 20 minutes. After that, 9 mg 2,6-Di-tert.-butyl-4-methylphenol was added and the volatiles were removed by distillation under vacuum. The obtained reaction product was a slightly turbid, light yellow-brownish liquid.

NMR-analysis confirmed the expected structure.

GPC analysis gave the following results: Mn=1447 g/mol, Mw=6077, Mw/Mn=4.2

Application Testing

Formulation A (based on Ebecryl® 608)

| Raw material | Mass/g |
| --- | --- |
| TMPTA | 25 |
| TPGDA | 25 |
| Benzophenone | 6 |
| Ebecryl® 608 | 38 |
| Ebecryl® P115 | 6 |
| Total | 100 |

Preparation of Formulation A

TMPTA, TPGDA and Benzophenone were mixed using a Dispermat® CV (30 min, 3000 rpm, 3 cm diameter dissolver disc). After that Ebecryl® 608 and Ebecryl® P115 wre added and the whole mixture was homogenized for 10 min at 3000 rpm.

Formulation B (Based on Laromer® LR 8986)

| Raw material | Mass/g |
| --- | --- |
| Laromer LR 8986 | 57.2 |
| Ebecryl 210 | 10.2 |
| HDDA | 26.5 |
| Darocure 4265 | 6.1 |
| Total | 100.0 |

Preparation of Formulation B

Laromer® LR 8986, Ebecryl® 210 and HDDA were mixed using a Dispermat® CV (15 min, 4000 rpm, dissolver disc with 3 cm diameter). After that Ebecryl® 608 and Ebecryl® P115 were added and the whole mixture was homogenized for 10 min at 3000 rpm.

Darocure 4265 was added shortly before application to prevent hardening of the formulation during storage.

Test Procedure 50 g of formulation A (or formulation B) and 0.25 g of additive were mixed using a Dispermat® LC (2 min, 5000 rpm, dissolver disc with 3 cm diameter).

The samples were drawn up on a PET film (company: Pütz Folien, trade name Hostaphan GN 460) using an automatic K-Lox Printing Proofer from Erichsen as follows:

For slip measurement and tape release measurement with a 6 µm spiral doctor blade For the levelling evaluation with a 12 µm spiral doctor blade The wet coatings were hardened with the UV bank "Aktiprint Mini" (120 W/cm and a belt speed of 12 m/min) in 3 consecutive runs.

After 24 hours, tape release and COF were measured using a Thwing-Albert FP 2260.

The tape release performance was measured according to ASTM D3330. A Tesafilm® (transparent office Box 57404, length of approx. 24 cm) was glued onto the coating by hand and briefly pressed on with a finger. The tape release is then measured as described in the mentioned ASTM method. Only half of the Tesafilm® strip is removed to measure the so-called "tape release immediate". The other half is removed after 24 hours using the same method to measure the so-called "tape release 24 h". The lower the force value that is needed to remove the tape, the better the tape release properties of the additive is.

Foaming of the liquid coating was judged visually right after its preparation on a scale from 1 (no foam) to 6 (very much foam).

Leveling was judged visually on a scale from 1 (very good leveling) to 6 (very poor leveling).

The turbidity of the coating was judged visually on a scale from 1 (clear, transparent film) to 6 (non-transparent, turbid film).

Test Results

The following results were obtained for formulation A:

| Additive | Leveling | Turbidity | Tape Release directly in N | Tape Release 24 h in N |
| --- | --- | --- | --- | --- |
| COMPARATIVE Tego Rad ® 2500 | 3 | 1 | 0.429 | 0.972 |
| COMPARATIVE EXAMPLE 1 | 2 | 1 | 0.859 | 1.219 |
| EXAMPLE 1 | 1 | 1 | 0.356 | 0.972 |
| EXAMPLE 2 | 1 | 1 | 0.423 | 0.909 |
| EXAMPLE 3 | 1 | 1 | 0.557 | 1.419 |

The following results were obtained for formulation B:

| Additive | Leveling | Turbidity | Tape Release directly in N | Tape Release 24 h in N |
| --- | --- | --- | --- | --- |
| COMPARATIVE Tego Rad ® 2500 | 4 | 2 | 1.414 | 2.628 |

-continued

| Additive | Leveling | Turbidity | Tape Release directly in N | Tape Release 24 h in N |
|---|---|---|---|---|
| COMPARATIVE EXAMPLE 1 | 2 | 1 | 1.497 | 2.501 |
| EXAMPLE 1 | 1 | 1 | 0.985 | 1.649 |
| EXAMPLE 2 | 1 | 1 | 1.078 | 2.078 |
| EXAMPLE 3 | 1 | 1 | 1.263 | 2.197 |

It can be clearly seen that the inventive examples shows better compatibility (Additive of Example 1 present less turbidity and improved leveling) compared to the comparative Tego Rad® 2500 and the comparative example 1.

Measuring tape release properties reveals the most significant differences between the additives. All 3 inventive examples (EXAMPLE 1, 2 and 3) show a more effective release by the lower pulling force.

All examples had a reasonably low foam formation.

EXAMPLE 1 shows overall a combination of excellent compatibility and very beneficial release properties.

The invention claimed is:

1. A method of preparing a coating material, comprising adding to a radiation-curable coating composition 0.1 to 10.0% by weight, based on the total weight of the radiation-curable coating composition, of a polymer (A) having a polysiloxane backbone and at least two methacryloyl groups connected to the polysiloxane backbone via linking groups, wherein the linking groups comprise at least one non-cyclic ether group, and wherein the polysiloxane backbone is connected to the linking groups via a Si—C bond, and wherein polymer (A) is prepared by a process comprising
providing a polysiloxane backbone having at least two Si—H groups,
providing a molecule having at least one methacryloyl group, one allyl group, and at least one non-cyclic ether group located between the allyl group and the at least one methacryloyl group, and
forming a covalent bond between the polysiloxane backbone and the molecule by reacting the Si—H groups with the allyl group via a hydrosilylation reaction.

2. The method according to claim 1, wherein the radiation-curable coating composition further comprises a radiation curable binder which is different from the polymer (A).

3. The method according to claim 1, wherein the linking groups in polymer (A), independent of each other, comprise 1 to 100 non-cyclic ether groups.

4. The method according to claim 3, wherein the non-cyclic ether groups are polyalkylene oxide groups.

5. The method according to claim 4, wherein the polyalkylene oxide groups comprise at least one of polyethylene oxide, polypropylene oxide, and copolymers of ethylene oxide and propylene oxide.

6. The method according to claim 1, wherein the polysiloxane backbone of polymer (A) comprises repeating units of the formula (I) —[O-SiR$_2$]—, wherein R independent of each other represents a hydrocarbyl group having 1 to 30 carbon atoms.

7. The method according to claim 6, wherein the polysiloxane backbone comprises 2 to 300 repeating units of formula (I).

8. The method according to claim 1, wherein providing the polysiloxane backbone having at least two Si—H groups comprises providing a polydimethylsiloxane having two terminal Si—H groups.

9. The method according to claim 1, wherein providing the polysiloxane backbone having at least two Si—H groups comprises providing a polydimethylsiloxane having at least two lateral Si—H groups.

10. The method according to claim 1, wherein providing the molecule having at least one methacryloyl group, one allyl group, and at least one non-cyclic ether group located between the allyl group and the at least one methacryloyl group comprises providing an allyloxy polyethyleneglycol methacrylate.

11. The method according to claim 1, comprising further adding to the radiation-curable coating composition a polymer having a polysiloxane backbone and one methacryloyl group connected to the polysiloxane backbone via at least one linking group, wherein the at least one linking group comprises at least one non-cyclic ether group, and wherein the polysiloxane backbone is connected to the at least one linking group via a Si—C bond, and wherein the polysiloxane backbone further has a pendent or terminal polyalkylene oxide segment comprising at least 25 mol-% polypropylene oxide.

12. The method according to claim 11, comprising further adding to the radiation-curable composition a polymer having a polysiloxane backbone and at least two polyalkylene oxide segments comprising at least 25 mol-% polypropylene oxide connected to the polysiloxane backbone via Si—C bonds.

13. The method according to claim 1, wherein each linking group of the linking groups comprises at least one non-cyclic ether group.

14. A method comprising applying a radiation-curable coating material to a substrate and curing the material by exposure to actinic radiation to form a cured composition, the coating material having been prepared by adding to a radiation-curable coating composition 0.1 to 10.0% by weight, based on the total weight of the radiation-curable coating composition, of a polymer (A) having a polysiloxane backbone and at least two methacryloyl groups connected to the polysiloxane backbone via linking groups, wherein the linking groups comprise at least one non-cyclic ether group, and wherein the polysiloxane backbone is connected to the linking groups via a Si—C bond, and wherein polymer (A) is prepared by a process comprising
providing a polysiloxane backbone having at least two Si-H groups,
providing a molecule having at least one methacryloyl group, one allyl group, and at least one non-cyclic ether group located between the allyl group and the at least one methacryloyl group, and
forming a covalent bond between the polysiloxane backbone and the molecule by reacting the Si—H groups with the allyl group via a hydrosilylation reaction.

15. The method according to claim 14, wherein the cured composition possesses at least one improved surface property selected from surface slip, water repellency, a dirt removal property, resistance to dirt adhesion, and a tape release property, relative to a cured coating composition prepared in the absence of polymer (A).

* * * * *